United States Patent [19]

Burkert et al.

[11] 4,444,667

[45] Apr. 24, 1984

[54] FLOCCULANT FOR SLUDGES

[75] Inventors: Hans Burkert, Ludwigshafen; Friedrich Brunnmueller, Limburgerhof; Karl-Heinz Beyer, Frankenthal; Michael Kroener, Mannheim; Hans Mueller, Ludwigshafen, all of Fed. Rep. of Germany

[73] Assignee: BASF Aktiengesellschaft, Ludwigshafen, Fed. Rep. of Germany

[21] Appl. No.: 397,235

[22] Filed: Jul. 12, 1982

[30] Foreign Application Priority Data

Apr. 15, 1982 [DE] Fed. Rep. of Germany ....... 3213873

[51] Int. Cl.³ ........................... C02F 11/14; C02F 1/56
[52] U.S. Cl. ..................................... 210/735; 525/383
[58] Field of Search ........ 210/725, 727, 728, 732–736; 525/326.1, 383; 526/312

[56] References Cited

U.S. PATENT DOCUMENTS

| | | | |
|---|---|---|---|
| 3,424,791 | 1/1969 | Kurtz et al. | 564/124 |
| 3,715,336 | 2/1973 | Nowak et al. | 210/735 |
| 4,217,214 | 8/1980 | Dubin | 210/735 |

FOREIGN PATENT DOCUMENTS

| | | | |
|---|---|---|---|
| 1224304 | 3/1967 | Fed. Rep. of Germany. | |
| 1817309 | 7/1970 | Fed. Rep. of Germany. | |
| 2076966 | 10/1971 | France. | |
| 51-99693 | 9/1976 | Japan | 210/732 |
| 618175 | 2/1949 | United Kingdom | 525/383 |

OTHER PUBLICATIONS

Chemical Abstracts, "Polymerization of N-methyl-N-vinylformamide and Preparation of quaternized poly (vinylamine) from the polymer," 84: 5731h, Jan. 1976.

*Primary Examiner*—Peter A. Hruskoci
*Attorney, Agent, or Firm*—Oblon, Fisher, Spivak, McClelland & Maier

[57] ABSTRACT

Sludges are flocculated by the addition of a polymer which is prepared by the homopolymerization of N-vinylformamide in the presence of a free-radical polymerization initiator to give a poly-N-vinylformamide, followed by hydrolysis of from 10 to 90% of the formyl groups in the poly-N-vinylformamide.

3 Claims, No Drawings

FLOCCULANT FOR SLUDGES

U.S. Pat. No. 4,217,214 discloses that a polyvinylamine hydrochloride with a molecular weight greater than $3\times10^5$ may be used as a flocculant for particles suspended in water, and for treating effluents and sludges. According to the above patent, polyvinylamine hydrochloride is obtained when acetaldehyde is reacted with acetamide to give ethylidene-bis-acetamide, the latter is cleaved thermally into N-vinylacetamide and acetamide, the N-vinylacetamide is polymerized, and the resulting poly-N-vinylacetamide is hydrolyzed. Although polyvinylamine hydrochloride is a good flocculant, it appears to be inefficient in the treatment of sludges.

It is an object of the present invention to provide a flocculant which is based on a polymer containing N-vinylamine units and is suitable for treating sludges, in particular sewage sludges.

We have found that this object is achieved, according to the invention, when the flocculant used is a polymer which is prepared by homopolymerization of the compound of the formula

$CH_2=CH-NH-CHO$ (N-vinylformamide)

in the presence of a free-radical polymerization initiator to give a poly-N-vinylformamide, followed by hydrolysis of from 10 to 90% of the formyl groups in the poly-N-vinylformamide.

The compound of the formula

$CH_2=CH-NH-CHO$ (N-vinylformamide)

can be prepared, for example, using the process described in German Published Application DAS No. 224,304. N-vinylformamide is polymerized in a solvent or diluent at from 30° to 140° C., using a free-radical polymerization initiator, for example a peroxide, a hydroperoxide, a redox catalyst, or an azo compound which decomposes to give free radicals. The molecular weight of the polymer obtained varies depending on the polymerization conditions, and is characterized below by means of the Fikentscher K values. Polymers having a high K value, eg. from 80 to 200, are used as flocculants. They are preferably prepared by polymerization of N-vinylformamide in water, using a water-soluble azo compound, eg. 2,2'-azo-bis-(2-amidinopropane) hydrochloride or 4,4'-azo-bis-(4'-cyanopentanoic acid). In addition to solution polymerization in water, in a water-soluble solvent or in a mixture of water with a water-soluble solvent, the polymerization may also be carried out as a water-in-oil emulsion polymerization in a water-immiscible solvent, as the converse suspension polymerization, or as a precipitation polymerization in an organic solvent to prepare a finely divided polymer. The polymerization in an aqueous medium is carried out at a pH of from 4 to 9, preferably from 5 to 7. Solution polymerization predominantly produces polymer solutions which have a solids content of from 3 to 30% by weight.

The polymer obtained is subjected to solvolysis at from 20° to 200° C., preferably from 70° to 90° C., in the presence of an acid or a base to give a poly-(aminoethylene), formyl groups being split off. About 0.05 to 1.5 equivalents (one equivalent is to be understood as meaning one gram equivalent throughout this text) of an acid, eg. hydrochloric acid, hydrobromic acid, phosphoric acid or sulfuric acid, are required per equivalent of formyl groups in the poly-N-vinylformamide. The pH is 0-5 during the acidic hydrolysis, and may be obtained by the addition of a carboxylic acid, eg. formic acid, acetic acid or propionic acid, a sulfonic acid, eg. benzenesulfonic acid or toluenesulfonic acid, or an inorganic acid, eg. hydrochloric acid, sulfuric acid, phosphoric acid or hydrobromic acid.

Furthermore, the solvolysis of the formyl groups in the poly-N-vinylformamide may be carried out in an alkaline medium, for example at a pH of 9-14, preferably obtained by adding sodium hydroxide solution or potassium hydroxide solution. However, it is also possible to use ammonia, an amine or an alkaline earth metal base, eg. calcium hydroxide. The alkaline hydrolysis is carried out using from 0.05 to 1.5, preferably from 0.4 to 1.0, equivalents of a base.

The reaction in which formyl groups are split off may be carried out in various solvents, for example in water, an alcohol, ammonia or an amine, in a mixture, for example of water and an alcohol, or in an aqueous solution of ammonia and/or an amine. In some cases it may be advantageous to carry out the solvolysis in an inert diluent, for example in dioxane, or an aliphatic or aromatic hydrocarbon. Poly-(1-aminoethylenes) are obtained in all cases. The hydrolysis, ie. splitting off formyl groups from the poly-N-vinylformamide in water by means of an acid or a base, gives formic acid or a salt of formic acid as a by-product. When the solvolysis is carried out in an alcohol, likewise in the presence of an acid or a base, the by-product is a formic acid ester, while solvolysis in ammonia or an amine gives formamide or a substituted formamide. Low boiling alcohols, eg. methanol, ethanol, isopropanol, n-propanol, n-butanol and isobutanol, are particularly suitable for the solvolysis. The by-products of the solvolysis may be removed from the system either during the solvolysis or after its completion. When an alcohol is used as the solvent, it is, for example, possible to remove the resulting formic acid ester azeotropically from the reaction mixture, and the presence of an entraining agent may be required for this purpose. In the case of the hydrolysis, also, the by-product (formic acid) may be removed from the system either during hydrolysis or after its completion. Preferably, the polyvinylformamide is hydrolyzed in aqueous solution with sodium hydroxide solution or hydrochloric acid at from 70° to 90° C. The K value of the hydrolyzed polymer corresponds to that of the non-hydrolyzed homopolymer of N-vinylformamide.

The polyvinylformamide is partially hydrolyzed, so that from 10 to 90%, preferably from 40 to 80%, of the formyl groups in the polyvinylformamide are split off. In this manner, polymers are obtained which, for example, may be represented by the formula:

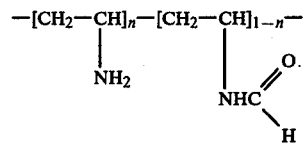

where n is from 0.1 to 0.9, preferably from 0.4 to 0.8.

The course of the hydrolysis depends on the reaction conditions and may be carried out under reduced pressure, atmospheric pressure or superatmospheric pressure. An aqueous or alcoholic solution is obtained, from which the polymer can be isolated after the low molecular weight constituents have been separated off. However, it is also possible to use this solution directly as a flocculant for sludges. Hydrolysis with a base gives a polymer having free amino groups, while hydrolysis with an acid gives the corresponding polymer salt, from which however a polymer having free amino groups is obtained by the addition of a base, eg. sodium hydroxide solution or potassium hydroxide solution.

The sludges treated according to the invention originate from communal or industrial treatment plants, and are those substances which have settled out at the bottom of the treatment plants during clarification of the effluent. The solids content of the sludges is about 2–8% by weight. By adding the polymer used according to the invention to the sludge, in particular to a sludge from a communal treatment plant, it is possible to obtain a residue which can be easily filtered or centrifuged and may have a solids content as high as about 30% by weight. The flocculant is employed in an amount of from 100 to 350 g/m³ of sludge and must be thoroughly distributed in the sludge, for example using a mixing drum.

Flocculation occurs virtually immediately after addition of the flocculant, and an increase in the size of the particles of the solids to be flocculated can be observed. The water is separated from the residue using a conventional apparatus, such as a perforated belt press or a centrifuge. The residue may then be either stored in a dump or incinerated.

In the Examples, parts and percentages are by weight. The K values given for the polymers were measured in 5% strength aqueous sodium chloride solution at 25° C., according to H. Fikentscher, Cellulose Chemie 13 (1932), 58–64 and 71–74; $K = k \cdot 10^3$.

PREPARATION OF THE POLYMERS

Polymer 1

1,410.8 g of N-vinylformamide were dissolved in 7,888.4 g of water in a flask equipped with a stirrer, a thermometer and an apparatus for introducing nitrogen. Thereafter, 8.07 g of 2,2′-azo-bis-(2-amidinopropane) hydrochloride were added, the oxygen was removed by introducing nitrogen, and the reaction mixture was heated to 50° C. in the course of 1.4 hours and kept at this temperature for 7 hours. The conversion was 99.6%.

The resulting viscous polymer solution (K value of the homopolymer: 120) was then heated with 1,715.4 g of concentrated hydrochloric acid at 90° C. for 4 hours. The polymer obtained contained N-vinylformamide and N-vinylamine as polymerized units, and 90% of the formamide groups of the polymer had been hydrolyzed.

Polymer 2

In the apparatus described under Polymer 1, 1,410.8 g of N-vinylformamide in 7,888.4 ml of water were polymerized at 50° C., using 2,2′-azo-bis-(2-amidinopropane) hydrochloride as the polymerization initiator. Polymerization was complete after 7 hours, and the conversion was 99.6%.

1,143.6 g of concentrated hydrochloric acid were added to the viscous polymer solution (K value of the polymer: 120), and the reaction mixture was heated at 90° C. for 4 hours. The polymer obtained contained N-vinylformamide and aminoethylene as polymerized units, and 60% of the N-formyl groups had been hydrolyzed.

Polymer 3

The prior art flocculant used was a polydimethylaminoethylmethacrylate hydrochloride with a K value of 160.

0.1% strength aqueous solutions of Polymers 1, 2 and 3 were prepared and tested as flocculants for sewage sludge. The following test methods were employed:

(a) Determination of the flocculation number and the filtration rate

Defined amounts of a 0.1% strength aqueous flocculant solution were added to 500 ml of a sewage sludge in a 1 l measuring cylinder. Flocculation occurred during mixing. The content of the measuring cylinder was then emptied into a Büchner funnel and was filtered. The flocculation was assessed visually from the filter residue, according to the following scale:

| | | |
|---|---|---|
| Scarcely visible flocculation | = | flocculation number 1 |
| Slight flocculation | = | flocculation number 2 |
| Moderate flocculation | = | flocculation number 3 |
| Good flocculation, adequate in practice in most cases | = | flocculation number 4 |
| Very good, optimum flocculation | = | flocculation number 5 |

At the same time, the amounts of filtrate obtained after 30, 60, 90 and 120 seconds were measured.

(b) Flocculation efficiency

In this test, the amount of flocculant which must be added to a sludge to achieve optimum flocculation (flocculation number = 5) was also determined, using a 1 l measuring cylinder.

EXAMPLE 1

The flocculation efficiency of Polymers 1 and 2 in comparison with that of Polymer 3 was determined by the method described above under (b), using a digested sludge from a communal treatment plant. The amount of flocculant required for optimum flocculation was 200 mg/l of sludge in the case of Polymer 1, 150 mg/l of sludge in the case of Polymer 2, and 3,250 mg/l of sludge in the case of Polymer 3. Accordingly, Polymer 2 is substantially more efficient than Polymer 1, and both of these are substantially more efficient than the prior art Polymer 3.

EXAMPLE 2

The flocculation number and the filtration rate of Polymers 1 and 2 in comparison with those of Polymer 3 were determined by the method described under (a), using a digested sludge from a commercial treatment plant:

| Polymer | | Amount added mg/l of sludge | Flocculation number | Amount of filtrate in ml after | | | |
|---|---|---|---|---|---|---|---|
| | | | | 30 | 60 | 90 | 120 |
| | | | | seconds | | | |
| 1 | | 100 | 3–4 | | | | |
| 1 | | 150 | 4–5 | | | | |
| 1 | | 200 | 5 | 310 | 360 | 370 | 375 |
| 2 | | 50 | 3–4 | | | | |
| 2 | | 100 | 4 | | | | |
| 2 | | 150 | 5 | 325 | 370 | 380 | 390 |
| 3 | Com- | 150 | 3 | | | | |

-continued

| Polymer | | Amount added mg/l of sludge | Flocculation number | Amount of filtrate in ml after | | | |
|---|---|---|---|---|---|---|---|
| | | | | 30 | 60 | 90 | 120 |
| | | | | seconds | | | |
| 3 | pari- | 200 | 4 | | | | |
| 3 | son | 250 | 5 | 230 | 325 | 350 | 370 |

We claim:

1. A process for flocculating sewage sludge or sludge from communal or industrial treatment plants which comprises (a) adding to the sludge a flocculant in sufficient amount to flocculate said sludge wherein said flocculant is a polymer having a Fikentscher K value of about 80 to 200 and prepared by homopolymerization of a compound of the formula $CH_2=CH-NH-CHO$ (n-vinylformamide) in the presence of a free-radical polymerization initiator to give a poly-N-vinylformamide, followed by hydrolysis of from 10 to 90% of the formyl groups in the poly-N-vinylformamide, and then (b) separating the flocculated sludge from the residual watery liquid.

2. A process as claimed in claim 1, wherein, in the polymer employed, from 40 to 80% of the formyl groups of the poly-N-vinylformamide are hydrolyzed.

3. A process as claimed in claim 1, wherein the solids content of the sludge is from 2 to 8% by weight, and the amount of flocculant added to the sludge is from 100 to 350 $g/m^3$ of sludge.

* * * * *